United States Patent
Becker et al.

[11] Patent Number: 6,007,607
[45] Date of Patent: Dec. 28, 1999

[54] APPARATUS AND PROCESS FOR CLEANING FILTERS IN A TEXTILE MACHINE USING A MOVEABLE SCRAPER ASSEMBLY

[75] Inventors: Rudolf Becker, Ingolstadt; Michael Strobel, Eichstätt, both of Germany

[73] Assignee: Rieter Ingolstadt Spinnereimaschinenbau AG, Ingolstadt, Germany

[21] Appl. No.: 09/054,041

[22] Filed: Apr. 2, 1998

[30] Foreign Application Priority Data

Apr. 4, 1997 [DE] Germany ............ 197 13 747

[51] Int. Cl.⁶ .......... B01D 35/16; B01D 29/64; B01D 35/143
[52] U.S. Cl. .......... 95/278; 55/283; 55/296; 55/301; 55/501; 96/400; 96/421; 95/20
[58] Field of Search .......... 55/283, 295, 296, 55/297, 298, 301, 304, 501; 96/399, 400, 403, 421; 210/396; 95/278, 20

[56] References Cited

U.S. PATENT DOCUMENTS

| 2,596,518 | 5/1952 | Bahnson, Jr. ............ 55/296 |
| 2,609,064 | 9/1952 | King, Jr. ............ 55/296 |
| 2,689,020 | 9/1954 | Hersey, Jr. ............ 55/283 |
| 3,997,936 | 12/1976 | Smith, Jr. et al. . |
| 4,006,033 | 2/1977 | Schewe ............ 55/296 |
| 4,737,172 | 4/1988 | Halder . |

FOREIGN PATENT DOCUMENTS

| 1935153 | 1/1970 | Germany . |
| 2254490 | 5/1973 | Germany . |
| 3014132A1 | 10/1981 | Germany . |
| 8420376U1 | 11/1984 | Germany . |
| 3426012A1 | 1/1986 | Germany . |
| 3830991A1 | 3/1989 | Germany . |
| 9005495 | 8/1990 | Germany . |
| 9420376 | 3/1995 | Germany . |
| 4416541A1 | 11/1995 | Germany . |
| 4427771A1 | 2/1996 | Germany . |
| 599995 | 6/1978 | Switzerland . |

OTHER PUBLICATIONS

German Patent Office Search Report, Sep. 1, 1997.

Primary Examiner—David A. Simmons
Assistant Examiner—Robert Hopkins
Attorney, Agent, or Firm—Dority & Manning

[57] ABSTRACT

The present invention is concerned with a process for the filtering out of fibers form an air stream, in which process a stripping blade (3), for the purpose of cleaning, is moved along the surface of a filter (2) installed in a vacuum chamber (10). A controlled linear drive (51) is applied to the said stripper blade (3), by which the stripping blade (3) is made movable for the carrying out of a two phase operational motion along a linear path of travel. The end positions are located at opposite sides outside of the surface of the filter (2) in areas (A, B) wherein the stripping plate (3) is without contact with an opposing surface. During the first phase of travel, the fibrous material is scraped from the surface of the filter (2), while during the second phase of travel of the stripping blade (3) the said fibers are pressed against the filter (2) and the stripping plate (3) essentially moves back over the fiber without taking the said fibrous material with it. The low pressure in the filter chamber (12) is measured, and upon a drip in the measured low pressure to a point lower than a specified low pressure, the stripping blade is activated at least one time to carry out the said operational movement.

28 Claims, 4 Drawing Sheets

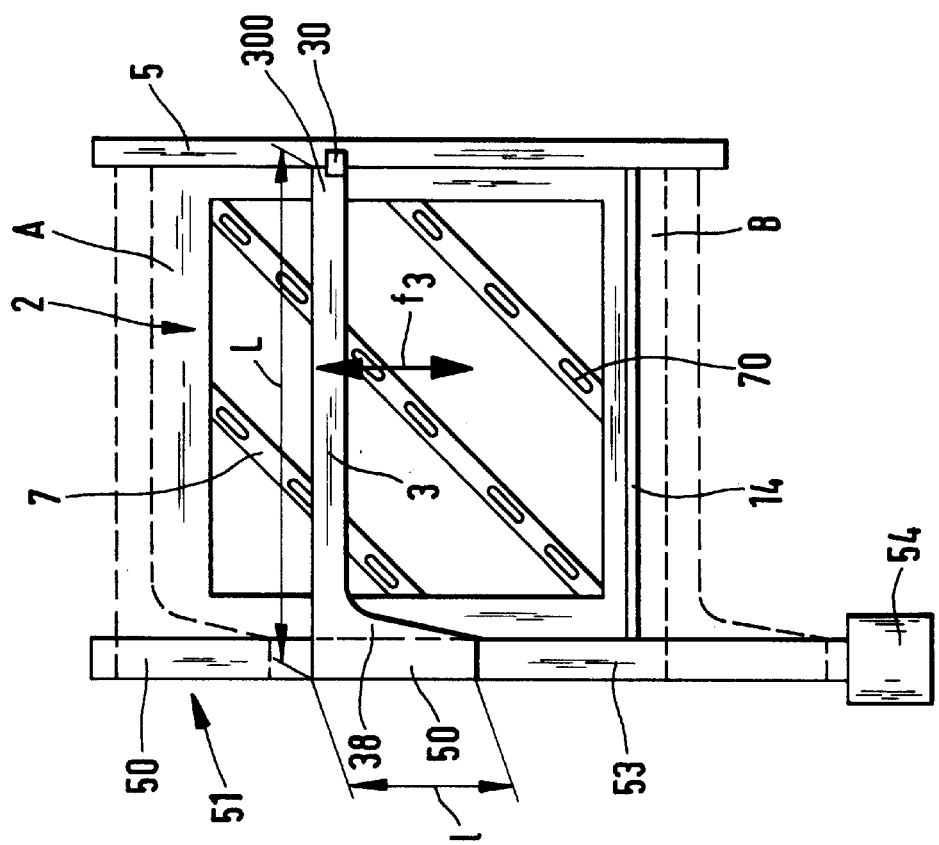
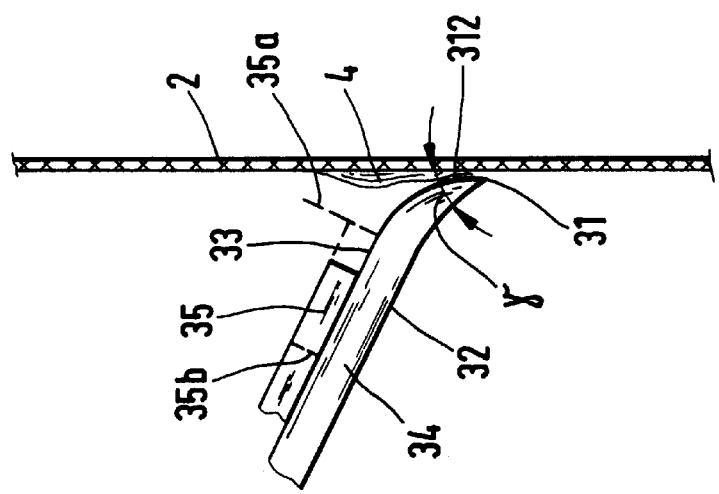

APPARATUS AND PROCESS FOR CLEANING FILTERS IN A TEXTILE MACHINE USING A MOVEABLE SCRAPER ASSEMBLY

BACKGROUND OF THE INVENTION

For the filtering out of fibers from a stream of air from textile machinery, the stream is conducted through a filter which retains the fibers borne in the air stream. This fibrous material builds up firmly on the filter and thus reduces the capacity for low pressure, which reacts through a piping system at different places on the machine in order to carry away free floating, undesirable fibers. In order to assure the functional ability of the low pressure system, from time to time the filter is cleaned by means of a scraper blade. In accord with a known process (DE 44 27 771 A1) for this purpose, a vertical scraper blade is run in a horizontal direction over the filter, and is subsequently lifted from the filter and returned to its original position. In order to execute this process, a complicated apparatus is necessary in order to impart to the scraper blade the desired movements. Moreover, fibrous material can agglomerate on the scraper blade, thereby reducing the efficiency of the same.

OBJECTS AND SUMMARY OF THE INVENTION

Thus it is a principal purpose of the invention to create a filtering process and an apparatus with higher efficiency, wherein the apparatus is simple in its construction as well as in the control thereof. Additional objects and advantages of the invention will be set forth in part in the following description, or may be obvious from the description, or may be learned through practice of the invention.

According to the invention, the scraper blade moves completely beyond the length of the filter so that the scraper blade meets no contacting surface. Then the fibrous material loosened by the scraper blade can fall from said scraper blade into a container from which it can be disposed of either manually or automatically at a convenient time.

In principle, each kind of working motion is acceptable, i.e. lineal or rotational. However, the lineal movement is particularly preferred, since equal relative motion is thereby achieved.

Advantageously, a back and forth movement is imparted to the scraper blade since this permits an optimization of the cleaning procedure in a simple manner. A further optimization is possible in a simple and advantageous manner by means of a development of the process of the invention wherein during the first motion phase of the scraper blade, fibrous material is scraped from the filter, while during the second motion phase of the scraper blade, pressure is exerted against the filter and the scraper blade moves back over the filter essentially without taking fibrous material with it since hereby an especially intensive cleaning of the filter is achieved.

To ameliorate damage to the scraper blade and at the same time to assure an optimal cleaning of the filter, a further advantageous improvement of the process of the invention can be provided wherein the pressure applied to the filter during the first motion phase of the scraper blade is gradually reduced. Since in the course of the scraping of fibrous material from the filter, the mass of material picked up on the scraper blade increases and, additionally, the fibrous material thickens on the filter, becoming fleece-like. This forms a roll when scraped by the blade. Since the scraper blade has no contact on the filter, the wound up fleece material is removed from the filter by rolling off.

Principally, the direction of the motion of the scraper blade is not decisive, but it has been shown that through the motion of the scraper blade wherein an essentially vertical operational movement is imparted to the scraper blade, gravity can be made use of in a particularly effective way. This is because the material scraped off of the filter does not have to fall along the length of the scraper blade where it can become caught and again held fast. So that the scraped off fibrous material can immediately and without hindrance fall below, it has been advantageously provided, that the two motion phases are adhered to wherein the scraper blade moves from above to below during the first motion phase and from below to above during the second motion phase.

The low pressure, which brings the individually loosened fibers to the filter, has the task to maintain fiber sensitive parts of a textile machine free of airborne fibers. To this end, a certain low pressure is required. Instead of, as has been conventionally the case, carrying out the cleaning of the filter with a dependency on the working time or, in the case of stretch machines, to work with tailored band lengths, the process in accord with the invention is carried out in a practical manner wherein the low pressure in the filter chamber is measured, and upon the rising of said measured low pressure above a specified set pressure, the scraper blade is activated at least once to the carrying out of the operational movement.

By this means, in a simple and direct manner, the desired low pressure is assured. It has been shown that the cleaning of the filter with the aid of the described process is very effective. If, in a case where difficult, but yet fibrous materials hang up on the filter, then it can be of advantage if a cleaning of the filter is immediately repeated without first waiting until the low pressure threshold for the automatic release of the cleaning function is reached.

In the case of the conventional process for the cleaning of filters, the low pressure is shut off. Nevertheless, it has been demonstrated that with the present invention this is not necessary, on which account, advantageously, the cleaning of the filter is carried out without interruption of the low pressure.

For the execution of the above described process in accord with the present invention, an apparatus is provided for the filtering out of fibers from an air stream. The apparatus possesses a low pressure chamber in connection with a low pressure producing source, from which low pressure chamber a filter chamber is separated by means of a filter, along which filter, on the side averted from the source of low pressure, a scraper blade is movable. A controlled drive is allotted to the scraper blade by means of which drive the scraper blade is enabled in the execution of its operational movement, the two end positions of which movement are located outside the surface of the filter, each in an area respectively, in which areas the scraper blade is without contact with an opposing surface. Because of the clearance of the scraper blade in its two end positions, the fibrous material removed from the filter can easily and simply release itself from the scraper blade. This is achieved without the necessity of imparting to the scraper blade a complicated movement. Much more, a linear motion suffices, the course of which is substantially longer than the filter.

By means of an additional practical development of the invention, wherein the drive is a linear drive for each cleaning process step, always the same operational conditions are assured and the relative speed between the filter and the scraper blade is reliable. This allows a trustworthy cleaning of the filter and the scraper blade.

A design wherein the scraper blade is inclined toward the surface of the filter and its leading scraping surface, during the first motion phase, forms an obtuse angle ($\alpha$) and its following pressure surface during this motion phase forms an acute angle ($\beta$), makes possible in a first movement of the scraper blade an efficient removal of the fibrous material from the filter, while, in a second movement in the other direction, possibly remaining residual fibrous material on the filter surface can be picked up on the other side of the scraper blade so that upon the next cleaning sequence this can be effectively scraped away. The inclination of the scraper blade wherein the obtuse angle ($\alpha$) lies between 105° and 135° is especially advantageous.

Demonstration has shown that through the choice of an elastic lip supported on one side of the scraper, a scraping during the first motion phase and passing over residual fibrous material which is possibly on the filter during the second motion phase, is most assuredly attained where the scraping effect is optimized through the choice of the flexibility of the lip. A further improvement of the scraping operation is achieved in the design of the elastic lip wherein the lip possesses an acute angled working edge which is bounded on the one side by the scraping surface and on the other side by a pressure surface which are separated from one another by a front surface. Through the development of the elastic lip wherein the front surface of the elastic lip gradually transitions to the pressing surface, the return glide of the elastic lip over residual fibrous material possibly remaining on the filter is additionally markedly improved.

The various fibrous materials which come to a textile machine for handling exhibit different characteristics. Thus, it is a matter of advantage if a matching is made of the filter material to be removed from the filter to an adjustment of the flexibility of the lip, whereby, in accord with the material, the distance of the support of the lip from the working edge of about 3 to 8 mm has shown itself to be particularly favorable.

The attainment of a high degree of stiffness of the scraper blade is shown by the design wherein the scraper blade possesses an acute angled tip profile and possibly wherein the scraper blade is affixed to the elastic lip by means of several connecting screws, the nuts of which are located in that space enclosed by the two legs of the angular profile. In order to prevent accumulation of fibers on the nuts, which find themselves in an unfavorable position in regard to flow pattern, these nuts are advantageously shielded.

In order to exclude a flop-over of the scraper blade parallel to the surface of the filter, and do so independently of the fibrous material to be removed, it is advantageous if said stripper blade is designed with its two ends contained in guides respectively, wherein one end is connected to the linear drive and in the longitudinal extension of said guide, said end exhibits a length (l) which is essentially 30% to 50% of the length (L) of the scraper blade.

Since, during the scraping of the filter, a continually larger fleece or wadding bundle builds up, an improvement of the apparatus of the invention is especially practical wherein the guides of the scraper blade are inclined toward the filter in such a manner that the scraper blade, when nearing its first end position, lies against said filter with greater force than it does when nearing its second end position, wherein the angle of inclination can be fixed between 1° and 4°.

In principle, the arrangement of the prescribed movement track by means of the guides is without special importance. In any case, the design of the object of the invention determines largely that the guides are installed vertically.

Due to this vertical disposition, fibrous material removed from the filter can fall from the scraper blade in a very simple manner. This effect is intensified by the practical improvement of the invention wherein the first end position of the scraper blade is installed above the filter.

Through the construction of the apparatus of the invention wherein there is affixed above the filter an inclined slide plate tilted away from the guides of the scraper blade, fibrous material, which has possibly been carried up by the scraper blade, can be subject to the action of the low pressure induced air flow and gravity, thus falling again below where scraped off fibrous material is collected for later disposal and/or recycling.

It is important that a continually operating, sufficiently strong low pressure be maintained, both for the particulate removal at the various positions of the machine from which the loose fibers are sucked away and conducted to the filter, as well as for the feed of the fibers removed from the filter into a collection chamber located underneath said filter. By means of the enhancement wherein a low pressure monitor is installed on the low pressure enclosure which, by mens of a control device, is controllingly connected with the linear drive of the scraper blade, this effective measure is assured without the necessity of imposing or observing different cleaning operational frequencies to suit fibrous materials of different characters.

The control of the cleaning is done through the described invention compliant design which is continually automatically monitoring the conditions of the moment, whereby a further operational matching to different materials can be achieved by means of programming a control device wherein the control device is set at a specified value, in particular upon a value of 90% to 70%, of the set low pressure at which the scraper blade is activated for the execution of at least one operational movement.

In order that the filter does not excessively bow inwards as a result of low pressure with the result that the scraper blade, in spite of the flexibility of the lip, cannot properly lay against the filter surface, it is advantageous to have the filter supported wherein the filter on that side facing away from the scraper blade possesses structural support struts running include to the longitudinal extension and to the movement direction of the scraper blade, which support is so installed that the filter in any operational position of the scraper blade is always supported by at least two of said struts.

For this reason, the structural supporting struts purposely possess holes, wherein the achievement is that the accumulating fleece on the filter cohesively forms between two cleaning cycles, which greatly facilitates the scraping operation.

Advantageously, the collection chamber for the scraped off material is separated from the filter chamber since, in this way, exposing the accumulated fibrous material already in the chamber to high suction does not occur. A slide plate advantageously provided affixed to the horizontal wall and extending upward from the horizontal wall while continually distancing itself from the filter, assists the guidance of the scraped off fibrous material into the collection chamber. The slide plate, used for an accumulation of the said scraped off materials, takes care that the coherent fibrous material forms such a mass, that it cannot be drawn back to the filter.

The process in accord with the present invention and the apparatus of said invention are of high efficiency and reliability. At the same time, the apparatus is simple in its construction and requires principally a simple drive, in particular a linear drive, so that the design, moreover, is economical in manufacture. With the control of the cleaning activity being dependent upon the low pressure of the suction chamber, effectivity is maintained without the necessity of additional controls. Further, in this matter, the said controls determine whether or not the provided cleaning intervals suffice to meet the demands of the process.

Embodiments of the invention are provided below and described more fully with the assistance of drawings.

BRIEF DESCRIPTION OF THE DRAWINGS

FIG. 5 shows a differently configured elastic lip in the same phase of motion as shown in FIG. 3, and FIG. 6 is a front view of the object of the invention.

DETAILED DESCRIPTION

Figure 1:
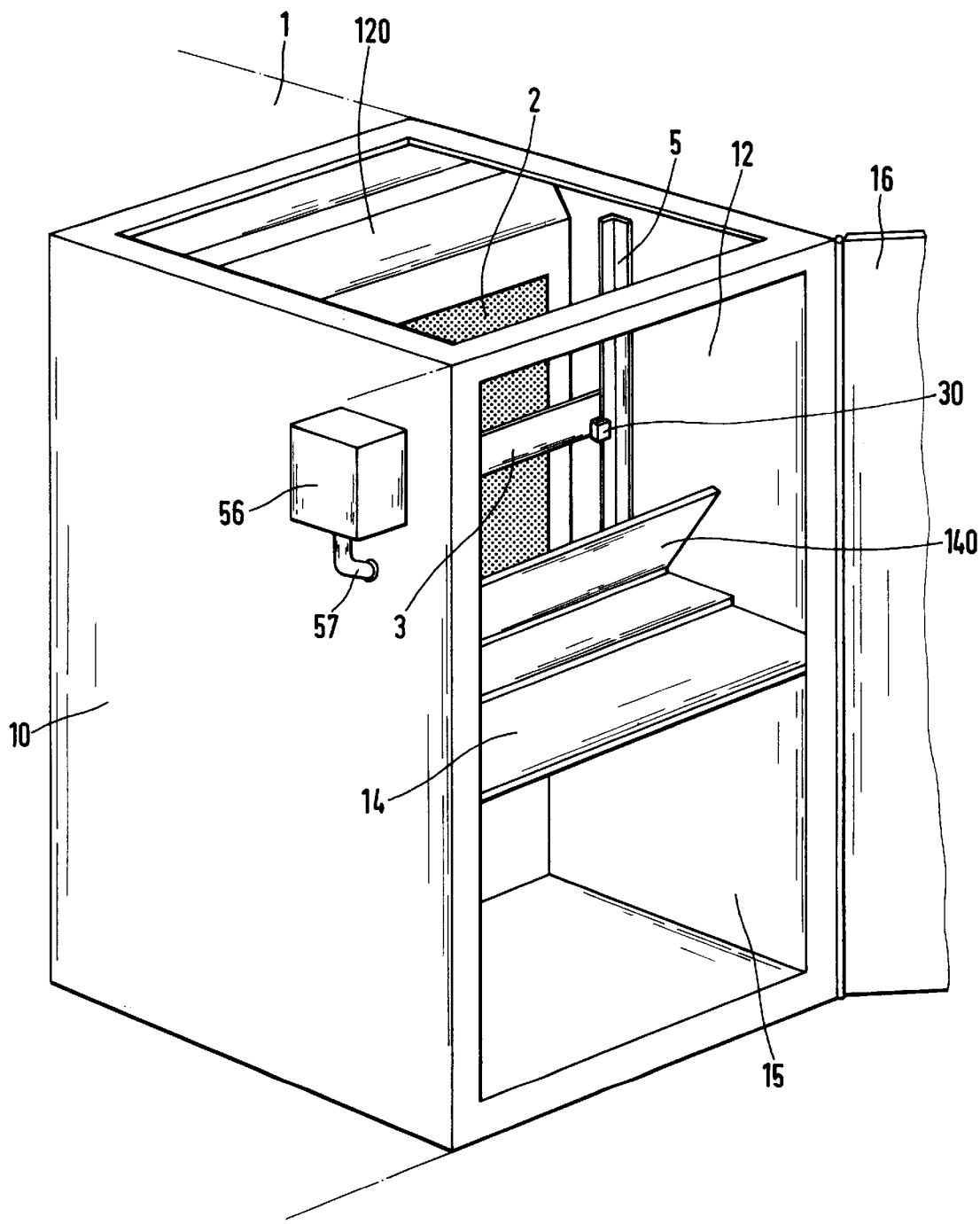
FIG. 1 shows a filter of a design in accord with invention in a perspective view.

Reference will now be made in detail to one or more presently preferred embodiments of the invention, examples of which are illustrated in the drawings. Each example is provided by way of explanation of the invention, and not as a limitation of the invention. For example, features illustrated or described as part of one embodiment can be used on another embodiment to yield still a further embodiment. It is intended that the present invention include such modifications and variations as come within the scope and spirit of the invention.

During the operation of textile machines of the most varied kinds, airborne fiber and fiber particulate is generated. This is pneumatically suctioned off and transferred to a filter by air stream transport. The filter retains the fibrous material, permitting the air to continue through to a low pressure source. For instance, in a rotor spinning machine, in connection with the process at the start of spinning, although also following a thread break, fibers and fiber particulate are pneumatically removed. Also in preparation and drawing spinning, including carding, etc. such particulate is generated and must be removed.

Figure 2:
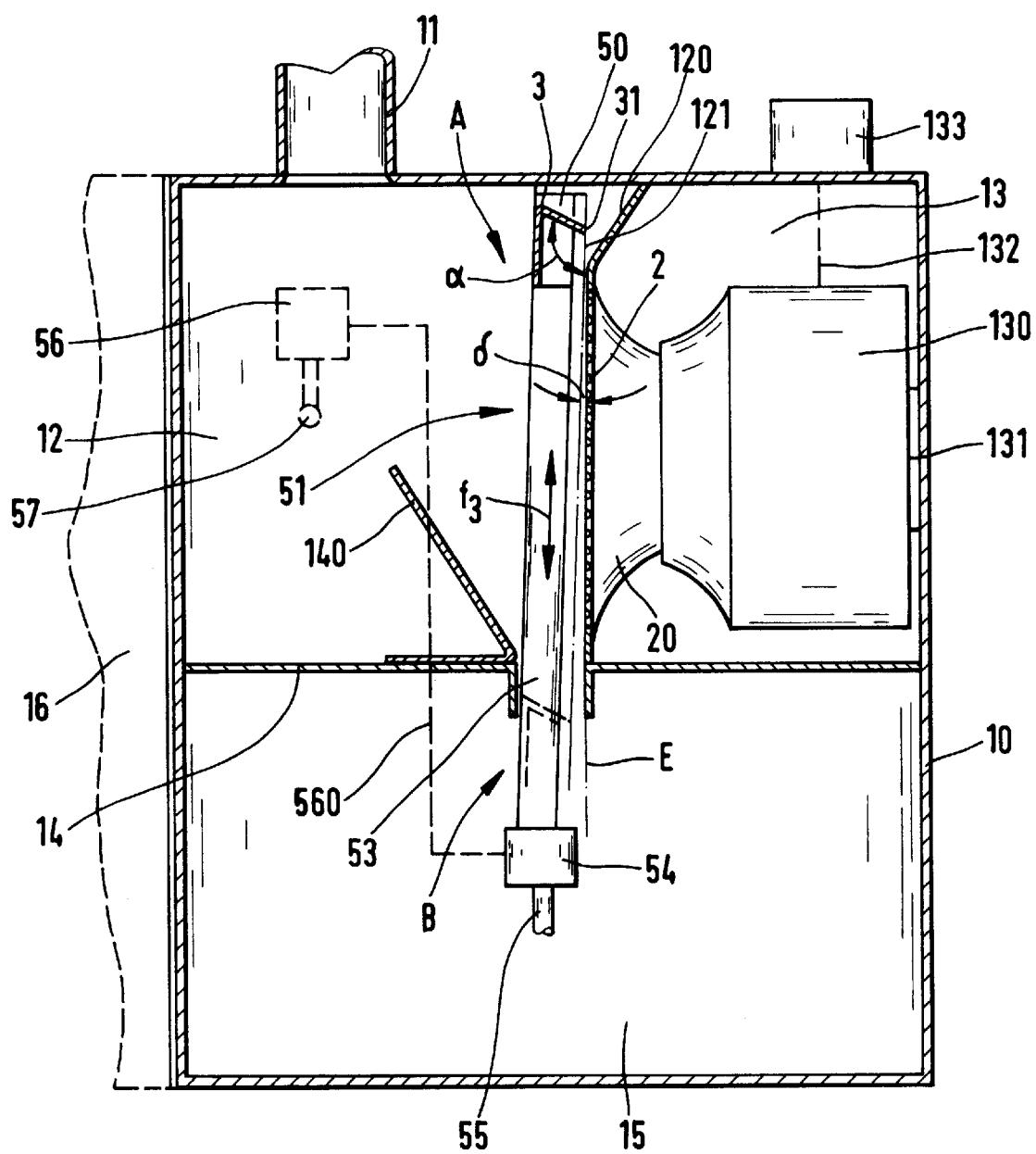
FIG. 2 is a section through FIG. 1.

In FIG. 1 a low pressure enclosure 10 is provided, which, for example, is a component of an entire drawing frame 1 (this is indicated as dotted lines). The drawing frames (not otherwise indicated) of a machine of this kind stand in the influence zone of a suction air stream, with the help of which loose fibers and fiber pieces (airborne particulate) of said zone are conducted away. The low pressure air stream, which in this manner has been enriched with fibrous material, is led to the low pressure enclosure 10 by a pipe 11 (FIG. 2).

Connected to the low pressure enclosure 10 are, as a rule, more than one such input pipes for the feed of particulate laden low pressure air from various point along the drawing frame 1. However, for ease of comprehension of the drawing, additional pipes have not been shown.

The low pressure enclosure 10 includes a filter chamber 12, which, by the action of a filter 2 is separated from a low pressure chamber 13 (FIG. 2) and again separated from a collection chamber 15 by means of a horizontal wall 14.

The low pressure enclosure 10 is essentially closed on all sides and exhibits generally the technologically necessary openings (one or more pipes 11 etc.) for the introduction of the airstream carrying the fibrous particulate and, possibly, additional openings—not shown—for the periodic removal of the fibrous materials accumulated in the collection chamber 15. Additional opening would include energy supply openings for electrical power, control wiring, compressed air lines and the like. Again, to simplify the drawing, these have not been shown. One additional opening shown is a door 16 for maintenance on the low pressure enclosure 10, which could serve, for instance, for the manual disposal of the fibrous material which is collected in the collection chamber 15. For the process here described, as well as for the corresponding apparatus, the method of disposal and or recycling has no pertinence.

In the low pressure enclosure 10, chamber 13 is found as a source of said low pressure, which, in accord with FIG. 2, is comprised of a exhauster 130, the drive motor 131 of which, with the help of control connection 132, is controllingly connected with a regulating device 133. This regulating device 133 operates in a conventional way and can, for this purpose, be a part of the main switch board for ON/OFF switching of the drawing frame 1, or be directly or indirectly connected thereto. The particular design of the control device 133 is not relevant to the description of the present invention.

On the rear side of the filter 2, a funnel 20 is affixed, which assures that the air pulled in by the exhauster 130 is not being evacuated from the low pressure enclosure 10 or from low pressure chamber 13, but comes out of the filter chamber 12 through the filter 2 into the exhauster 130.

On the intake side of the filter 2, that is on its side facing the filter chamber 12, during operation, fibrous material 4 (see FIG. 4) accumulates. This material is scraped off by a scraper blade 3 from the filter 2. The scraper blade 3 extends over the full breadth of the filter 2 and is guided on both sides of said filter 2 by vertical guides 5 and 50. One of these two guides 5 and 50, i.e. in FIGS. 1 and 6, the guide 5 is, in accord with the shown example, in the shape of a structural bar, which is embraced with little play by a fork shaped nose 30 attached to the scraper blade 3. In this arrangement, first, a reliable guidance for the scraper blade 3 is made possible and second, an uninterrupted travel along the guide 5 is assured. The other guide 50 is designed as a linear drive 51, which drives a sliding carriage 52, with which the drive side of the scraper blade 3 is connected for mobility.

In accord with the embodiment shown in FIGS. 2 and 6, the linear drive 51 possesses a pneumatic cylinder 53, one side of which is connected through a valve 54 and the compressed air line 55 to a source of compressed air (not shown.) In case it is desired, the pneumatic cylinder 53, can be connected in double action and be alternatingly loaded with compressed air. Moreover, in conventional manner, connecting lines and air release openings (not shown) can be provided, which enable the release of air from the cylinder air chamber(s).

The valve 54 is connected to a control device 56 by means of a control line 560. This control device 56 is independent of the control equipment 133 (FIG. 2) for the drive motor of the exhauster 130 and is responsive to a low pressure monitor 57, which measures the low pressure of the interior of the filter chamber 12.

The two guides 5 and 50 have a length of such dimension, that the scraper blade 3 during its operational lift or motions, travels not only the length of the filter 2 itself, but beyond this on into a zone A or B, in which zones, the scraper blade has no contact with the filter 2 or any other opposing surface.

The air, which carries the fibrous material, proceeds through the piping 11 or another conduit not shown, into the filter chamber 12 of the low pressure enclosure 10 and flows through the filter 2 to the exhauster 130 from which it will be expelled in the conventional manner. The fibrous material, which was conducted by the suction air flow into the filter chamber 12, is retained on the filter 2 and accumulates with passage of time. As this happens, then the low pressure in the filter chamber 12 rises toward atmospheric, although the exhauster 130 operates in an unchanged manner. This brings about the result that, in the textile machine positions, where the airborne particulate should be sucked away, the low pressure becomes weaker, so that even there the suction effect will be likewise reduced.

The low pressure monitor 57 which, by means of a probe continually watches over the low pressure in the filter chamber, sends to the control device an alarm signal when a specified loss of low pressure has been reached.

Thereupon, the valve 54, and possibly a valve (not shown) assigned to an additional air chamber of the cylinder 53, is activated.

The linear drive 51 now provides to the scraper blade 3 an operational movement over the filter 2, which said blade 3 thereupon removes the fibrous material 4 collected on filter 2. The said fibrous material 4 then falls by gravity down into the collection chamber 15, from which it will be manually or automatically disposed/recycled at selected periods.

The scraper blade 3 moves in a linear operational direction for this cleaning of the filter 2. Thus, no complicated movements are required in order to release the fibrous material 4 which has, as of this cleaning movement, accumulated between the filter 2 and the scraper blade 3. The scraper blade 3 has been brought not only along the entire length of the surface of this filter 2, but continuing along its established path, moves over the extended length of the filter 2 out into an end position in area A or B, in which the scraper blade lies in contact with no opposing surface, that is, without contact of a surface as described above.

In the FIGS. 1, 2 and 6, the scraper blade is continually oriented horizontally, so that its operational movements must be vertical. This is not an unconditional presupposition for the carrying out of the described process, but horizontal movement does have its advantages in regard to the removal of the material taken off from filter 2, since this fibrous material 4 does not fall parallel to, that is along the operational edge 31 of the scraper blade 3, but falls away in cross direction to the run of said scraper blade 3. The danger that the fibrous material 4 remains hanging on the scraper blade 3 is, with this horizontal arrangement of the scraper blade 3, substantially less than by the vertical arrangement of the same.

Principally, it is sufficient if the scraper blade 3 is moved from its end position zone A into its other end position zone B or, conversely, from its end position zone B into its end position zone A.

For the activation of the linear drive 51, that is for the initiation of the filter cleaning process, the control device is pre-set at an optional value which, for example, lies between 90% and 70% of the specified low pressure.

With an appropriate designing of the control device 56, even a second value can be input, this lying between the set-point low pressure and the threshold for the first activation of the linear drive and, depending on the choice of the said first value, can lie between 95% and 80% of the set-point low pressure. If, for example, a first cleaning of the filter 2 is carried out, without completely freeing filter 2 from fibrous material 4, then it can be desirable that an additional cleaning of filter 2 be immediately run through. For instance, if the scraper blade 3 during its first operational movement moves out of zone A into the zone B, then in its second operational movement, the scraper blade is brought back into its starting position in zone A. This said second input value serves this second activation of the linear drive 51, which activates a second cleaning operation of the filter 2 upon under-stepping.

In order to achieve optimal cleaning in the first place, fundamentally a two phase operational movement, that is, a double thrust movement can be provided.

In such a two phase movement, the scraper blade 3, during a first motion phase is brought out of the zone A into the zone B, and during the second motion phase, said scraper blade 3 is returned to zone A.

In the case of the single motion phase, as was first described, the active component, i.e. the actual working part of the scraper blade 3, extends at right angles to the surface of the filter 2, so that by either of these two possible single motion phase operational movements, essentially the same conditions are in force. If the scraper blade 3 in this case is arranged vertically in the low pressure enclosure 10, so that it carries out a horizontal operational movement, then again the conditions for the vertical fall of the scraped off fibrous material 4 into the collection chamber are the same.

In the case of the essentially vertical movement path (see double headed arrow $f_3$), wherein the orientation thereof is fixed by the arrangement of the guide 5 and 50, the fall of the fibrous material 4 into the collection chamber is only possible, without difficulty, during an operational stroke of the scraper blade from top to bottom. If the movement is in reverse of this, the fibrous material 4 is hindered in its fall from the scraper blade 3 until released by the said blade 3 is in its upper end position (see FIG. 2, zone A).

As is made plain in FIGS. 1 and 2, a release of the fibrous material 4 in this end position A is achieved thereby in that at the top part of filter 2 a slide plate 120 is installed. This said slide plate 120 is inclined in such a manner that it upwardly distances itself continually more from the scraper blade travel track set by guides 5 and 50. When the scraper blade 3 finds itself accordingly in its end position zone A, then the fibrous material 4 from said blade can drop down in the direction of the slide plate 120, on which it can now slide until it reaches the slot 121 between that slide plate 120 and the scraper blade 3 and falls into the collection chamber 15. The fibrous material 4, which reaches the collection chamber 15 in this manner, now takes on the form of a roll or indeed clumps. These shapes are too heavy to be retained by the filter surface during the fall, even when the exhauster 130 is producing, as it did before and after, a flow of air against the filter 2.

The process described in the foregoing as well as the described apparatus depicted in connection with the FIGS. 1 to 6 can, within the bounds of the present invention, be altered in manifold ways. For instance, an example of this would be by means of an exchange of features for equivalents thereof or other combinations of features. Thus, for instance, the scraper blade 3 could lie, as shown in the preferred design of FIGS. 2 to 5, during its cleaning, i.e. operational movement, not necessarily normal to the filter 2, but rather could exhibit an angular inclination in relation to the surface of said filter 2. By this means, the effectivity of the said blade 3 is increased in comparison to its positioning in a right angled alignment. At the same time, the scraper blade 3 enacts in its two motions, that is, movement out of the zone A into the zone B, and conversely out of the zone B and into the zone A, different effects in regard to the cleaning of the filter 2. This is made use of in an advantageous manner, in that the upward movement is characterized in that the scraper blade essentially glides over the fibrous material 4 on the surface of the filter 2, that is, as much as possible, does not carry this fibrous material, or any part thereof, with it.

So that the scraper blade 3 always finds the same operational conditions, it is advantageous if the linear drive 51 provides the scraper blade 3 with a double movement, i.e. a two motion phased operational movement, by which the first motion phase (see arrow $f_1$ in FIG. 4) is comprised of the downward stroke, which is the cleaning movement, and the second motion (see arrow $f_2$) of the scraper blade 3, which is the upwardly directed stroke, that is, the superficial gliding-over movement. Motion in this two-phase configuration is also possible with the horizontally situated operational track of the scraper blade 3.

Figure 3:
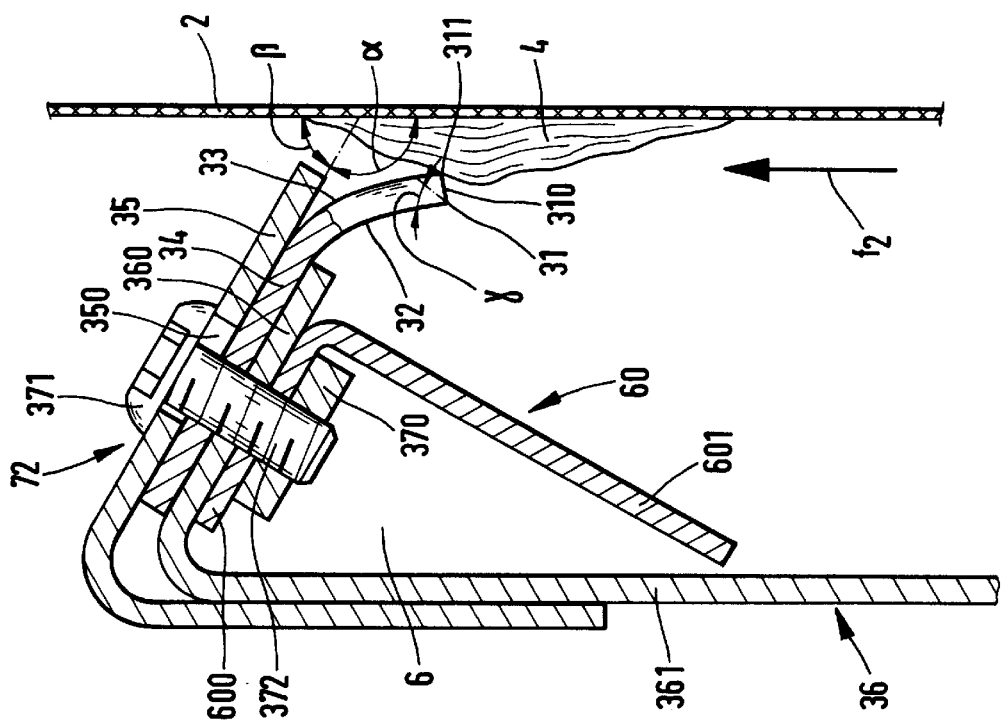
FIG. 3 is a profile view of a scraper blade designed in accord with the invention during the return motion phase in its start position.

For the achievement of the two designated effects (clean off and glide over), the inclination of the scraper blade 3 is so determined that the said blade 3, in its first movement (see $f_1$) with its lead edge, i.e. the scraping edge 32, and the surface of the filter 2, make an obtuse angle α (FIGS. 1 and 3).

It has been demonstrated that particularly good cleaning results are achieved when this obtuse angle has a value between 105° and 135°, although other angular values can likewise bring satisfactory results, depending on the individual operating conditions.

In the design here described, the active part of the scraper blade 3 has the shape of a flat bar with essentially parallel scraping and pressing surfaces 32 and 33.

Thus the leading edge 33 during this first motion phase (arrow $f_1$) forms an acute angle β (see FIG. 3) with the surface of the filter 2, which lies correspondingly between 75° and 45°. Experience shows, that in this way good cleaning characteristics are obtained. Further, good results regarding gliding over residuals of fibrous materials 4, which were left on filter 2 following the first motion phase (arrow $f_1$), are achieved.

Filter 2 has a base of a fine mesh which, in accord with how much fibrous material 4 has accumulated on it, builds a correspondingly strong fleece therefrom and yields more or less to the low pressure produced by the exhauster 130 by bowing into a varying degree of concavity in relation to the intake surface of the filter 2.

Figure 4:
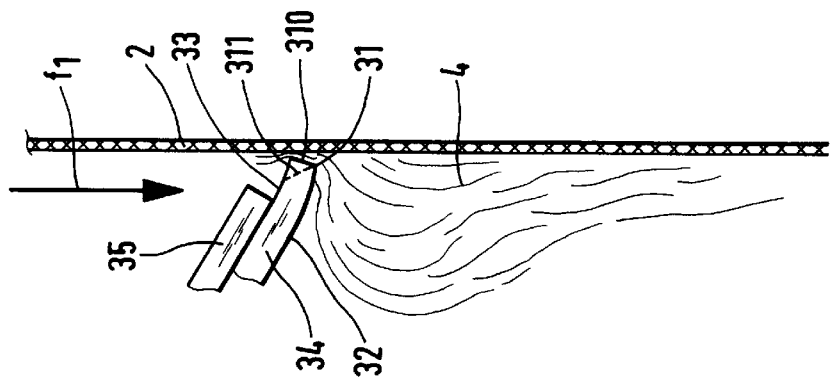
FIG. 4 shows a portion of the elastic lip of the scraping blade in a design in accord with the invention during its scraping motion phase.

To compensate for this action, the scraper blade 3 is provided with a elastic lip 34, as is to be seen in the embodiment of FIGS. 3 and 4, the said lip 34 forming on one side the scraping surface 32 and on the other, the pressing surface 33. So that the elastic lip 34 cannot deviate during the first motion phase (arrow $f_1$), it is reinforced on the side of the pressing surface 33 by means of a support 35, which extends until it is close to the working edge 31 and thus in the neighborhood of the filter 2.

Experience has shown that, with respect to the differing characteristics of the fibrous material 4 which accumulates on the filter 2, the lip 34 should likewise be of variable flexibility in its action. Since the flexibility of the lip 34 is determined by the material from which the said lip made, a matching of the flexibility of the elastic lip 34 to current applications is possible either by an exchange of the lip 34, which is expensive, or by other means. In accord with the embodiment shown in FIG. 3, the support 35 is extendibly adjustable relative to the working edge 31.

For this purpose, in FIG. 3, the scraper blade 3 exhibits an acutely angled structural member (profile bar 36), on which the elastic lip 34 lays with its scraping side. The elastic lip is further affixed to the profile bar by means of screw connections (screws 372 and nuts 370). On the pressure side, there lays upon the elastic lip 34 the previously supporting member 35 which, likewise, is affixed to the profile bar by screw connections (screws 372 and nuts 370). In this arrangement, the support member 35 is equipped with slots for the passage of the screws 372, which extend themselves cross ways to the longitudinal axis of the scraper blade 3 and thus permit an adjustment of the support 35 relative to the working edge 31 of the lip 34. In accord with FIG. 3, the support 35 with its end which faces away from filter 2, lies on the profile bar 36, that is, in its front operational position.

In FIG. 5, which will be further discussed later, the two end positions 35*a* and 35*b* are inserted in dotted outline, while the presently assumed interposed position is shown by solid lines. Experience has shown that it is sufficient if the support 35 is so adjustable vertically to the working edge 31 of the lip 34 that it shows a distance of 3 to 8 mm from the working edge 31, measured from the support edge which faces the said working edge 31 of the lip 34. In special cases, a deviation from these dimensions can be considered.

The elastic lip 34, on the one hand, must be sufficiently yielding so that it lies on the filter 2 even when this filter 2, as a result of the fibrous material 4 thereon collected, bows in relatively far. On the other hand, the said lip may not be too soft because then it will be worn away too quickly and also, during the first motion phase (arrow $f_1$), would then glide over the fibrous material 4. Experience has shown that the best results are obtained when the hardness of the material used for the elastic lip 34 is between 40 and 80 Shore Hardness.

FIG. 4, shows the elastic lip 34 during the first motion phase (see arrow $f_1$), during which, the scraper blade 3 is making a stroke from an upper end position in the zone A in downward movement and in doing so, is removing the accumulated fibrous material 4 from the filter 2. Because of the frictional resistance the lip 34 generates on the filter 2 with its contacting working edge 31, this lip 34 has the tendency, during the first motion phase, to fold over backward, this being prevented by the support 35. In this way, the full effectiveness of the cleaning stroke is maintained in its entirety. In FIG. 4, the lip 34 is shown only partially in section in order to more clearly indicate that the elastic lip 34, instead of having a front surface 310 at right angles to the scraping side 32 and the pressure side 33, can also possess an inclined front surface 311. The working edge 31—which is formed from the scraping side 32 on the one hand and from the inclined front surface 311 on the other hand—exhibits thus an acute angle γ (FIG. 3) which aids in the scraping off of the fibrous material 4 from the filter 2.

FIG. 3 shows the elastic lip 34 during the second motion phase (arrow $f_2$), wherein it has been presupposed that, for whatever reason, following the first motion phase, a large accumulation of fibrous material 4 was left remaining on the filter 2. When the elastic lip 34 encounters this hump of material, then it simply bends away since it is not supported on the scraping side 32.

The fibrous material 4 then can then be scraped down upon the next downward motion (in the direction of the arrow $f_1$) of the scraper blade, whereupon the loosened material 4 will fall into the collection chamber.

In accord with the construction as shown in FIG. 3, the elastic lip 34 shows a sharp edge at the transition from the scraping surface 32 to the front surface 310 or 311. In order to improve the scraping effectiveness on the one hand, as well as the sliding over the residual material 4 on the filter 2 for the elastic lip 34, in accord with FIG. 5, a pointed working tip 31 (see point angle γ) is provided. The front surface 312 then blends gradually, without steps, into the pressure surface 33.

Practice has shown that already in the majority of cases during the first motion phase, the fibrous material 4 is scraped without residuals from filter 2, that is the fibrous material is completely removed.

Should, for instance, the suction in the low pressure enclosure 10 deteriorate by opening the door 16 for the disposal of the fibrous material 4 which has been collected in the meantime in the collection chamber 15, and therefore the cleaning of the filter 2 is hindered and unstable relationships arise within the low pressure enclosure 10, then it is possible that a repetition of the filter cleaning is of advantage.

As already mentioned above, the elastic lip 34 can be affixed to the profile bar 36 of the scraper blade 3 by means of an appropriate number of screw connections, i.e. screws 372 and nuts 370—see FIG. 3. When this is done, the connection is so made that the heads 371 of the screws 372 are placed on the side facing the pressure surface 33 of the elastic lip 34, while the nuts 370 are arranged on that side 32 of the elastic lip 34 with the scraping surface. Since the scraper blade 3 first finds itself in its start position in the zone A (see FIG. 2), from which it moves in its first motion phase to the zone B, the scraper blade removes the fibrous material 4 from the filter 2 and then returns back to its start position A. During this complete two-phase operational movement (both motion phases, arrows $f_1$ and $f_2$), there is found on the side of the scraper blade 3 with the screw heads 371 no fibrous material 4, so that there is correspondingly no danger that, at this point, fiber particulate will be entrained in the surrounding air.

On the other hand, the fibrous material 4 will be found on the side of the scraping knife 3 with the nuts 370. The air borne fibrous, residual particulate arises from the fibers which were not bound into the rolls of fibrous material 4 or lumps formed by the scraping of filter 2. These vagabond fibers have the tendency to agglomerate on irregular shapes such as the nuts 370 and the ends of the screws 372. This tendency is greater if the nuts 370 are located in a dead area of the air flow. Such a dead space is found in the acute angle (see "dead space" 6 in FIG. 3) which is formed between the two legs 360 and 361 of the profile bar 36.

In accord with the preferred design of the scraper bar 3 as shown in FIG. 3, on account of the foregoing, the dead space 6 is shielded along essentially the entire length L (see FIG. 6) of the scraper blade 3. The shielding is comprised of a structural angle bar 60 (in FIG. 3), one leg 600 of which is affixed by the screws 372 and nuts 370 to the leg 360 of the profile bar 36, which latter is part of the scraper blade 3. The other leg 601 of said shielding angle bar 60 extends itself to close with the leg 361 of the profile bar 36.

Since the space encapsulated by the two legs 360 and 361 of the profile bar 36 of the scraper blade 3 and the shield 60, that is the said dead space 6, is difficult of access for maintenance, the installation and disassembly work for the same requires some effort. Also, the nuts 370 must be locked in place when the support 35 is adjusted to the working edge 31. Thus, it is of advantage if the nuts 370 with the shield bar 60 are connected in a non-rotary manner, since then these nuts 370 are then secured by that arrangement. This non-rotating securement can be done in conventional manner, for instance by welding. In this case, it suffices when simply the screws 372 are easily accessible.

It has already been mentioned above that the filter 2, as the accumulated fleece becomes stronger from the fibrous material 4 building up thereon, increasingly assumes the tendency to bow itself concavely inward, which is compensated for by the elasticity of the elastic lip 34. In order to work against this bowing tendency, FIG. 6 shows that provision has been made in the construction of the filter 2, that this filter, on its side facing the exhauster 130 is reinforced by a plurality of support struts 7. As the FIG. 6 further shows, the support struts are inclined in reference to the track of motion, i.e. the travel direction (see double-headed arrow $f_3$) of the scraper blade 3, as well as inclined to the longitudinal extension of said blade. The number of the support struts is so chosen, that the filter 2 is at least twice supported in every area of the said track of motion (see double-headed arrow $f_3$) of the scraper blade 3. For this purpose, the rectangular design of the filter 2 is provided with a first, diagonally arranged support strut 7 which is flanked on both sides with an additional support strut 7, each of which binds together the respective sides of said rectangle which lie on each side of the first support strut 7.

Other shapes of the filter 2 (square, circular, etc.) as well as additional support struts 7, if desired, may be provided.

When the accumulating fiber forms a cohesive mat on the filter 2, which remains unbroken at every point on the filter 2, then this fibrous material 4 is scraped from the filter 2 in an especially simple and safe manner. In order to assure the accumulation of this continuous unbroken mat of fibrous material 4, FIG. 6 shows the provision that the structural struts 7 have a plurality of openings or holes 70, respectively distributed along the longitudinal axis of said struts through which the air can flow to the exhauster 130. In this way, the suction flow of air is not only pulled through the filter 2 in the spaces between the struts 7, but also in the areas of the struts 7 themselves, moving from one side of the filter to the other, so that the fibers are pulled against the filter 2 and accumulate there. By having a correspondingly larger number of such openings 70, then the fibrous material 4 accumulates on the entire surface of the filter 2 in an unbroken fleece, which later is scraped off as a roll or clump from the filter 2. This action can be enhanced in that, as FIG. 6 shows, the openings 70 are in the shape of longitudinally extended slots.

The control of the filter cleaning can be oriented in conventional manner to a dependency of time periods or in connection with material through-put (for instance, fiber band length). However, control on the basis of the measured suction in the low pressure enclosure 10 has presented itself as especially advantageous and as a control method in which, in a very simple way, constant suction conditions can be maintained within specified tolerances. In this way, with this type of control, along with the appropriate precalibration of the control device 56 to desired set points, one or more operational movements may be carried out.

Mention has already been made above that the control device 56 for the regulation of the scraper blade 3 is solely dependent upon the attainment of a prescribed value for the low pressure. Since the scraper blade 3 does not obviously affect the suction relationships during its operational movements, the relationships within the intake conduit 11, and possibly additional such conduits, are not particularly changed, so that the draw frame 1 or other textile machines in which the filter 2 to be cleaned may be found, can continue to operate without interruption. The scraper blade is so conceived that it operates without fault even during the continual maintenance of the controlled pressure at filter 2. The control device 56 for the initiation of the filter cleaning can, on this account, be designed independently from a control mechanism 133 for the regulation of the drive motor 131.

Previously, a low pressure enclosure 10 has been shown essentially as a component of a textile machine, that it, a draw frame. Obviously, the low pressure enclosure 10 can also be a stand-alone equipment element, which is independent of any textile machines and may be connected with said textile machines by a system of ductwork or pipe line.

During the scraping of the fibrous material 4 from the filter 2, the scraped off fiber quantity increases, as does that contributed thereto by carry over on the scraper blade 3. This increasing quantity of fiber mass brings with it the danger that smaller fibrous quantities infiltrating between the scraper blade 3 and the filter 2 also increase. In accord with the embodiment depicted in FIG. 2, the two guides 5 and 50 are slightly slanted in respect to the filter 2, and so inclined, that the scraper blade 3, at one end if the travel path (near to the zone A) presses more heavily on filter 2 than at the other end of its travel path (near to zone B).

The guides 5 and 50 close in a very acute angle δ with the plane E, in which the filter 2 finds itself. This angle is of a general magnitude between 1° and 4°. Through this slanting of the guides 5 and 50 in respect to the plane E, consideration has been given to the mentioned tendency for particulate infiltration, in that the pressure generated by the scraper blade 3 in the direction of the filter 2 during the first motion phase of said scraper blade 3 is gradually and steplessly reduced. The fibrous material 4, during the progression of first motion phase (arrow $f_1$), is then scraped away as it is made much more subject to removal from the filter 2 by the action of the consolidated mass of the fleece-like fibrous material 4.

Independent as to whether or not the guides 5 and 50 are inclined relative to the filter 2, it is necessary that the scraper blade 3 not only exerts sufficient pressure in the direction of the filter 2, but also does this appropriately at any time regardless of direction of movement. This will assure that the fibrous material 4 is being properly removed from the filter 2. The scraper blade 3 must accordingly be aligned across filter 2 as well as being provided with parallel guides 5 and 50. Based on these grounds, and in accord with the FIG. 6, the scraper blade 3 and its linear drive 51 which provide that the scraper blade 3 exhibits, besides the end 300 which is governed by the guide 5, also an end 38 connected to the linear drive 51. This end 38, in comparison with the first mentioned end 300 is substantially longer in the direction of the guides 5 and 50. Experience has shown that this length 1 of the end 38 of the scraper blade, and thus also the sliding member 52 of the linear drive 51 should possess a length of the magnitude of essentially 30% to 50% of the length L of the scraper blade.

Although in FIG. 2 a horizontal wall 14 is shown between the filter chamber 12 and the collection chamber 15, this is not necessarily needed in all cases. Experience has indicated that the greatest portion of the fibrous material 4 which is scraped from filter 2 enters the collection chamber 15 in the form of rolls or clumps of fibers, and thus there is little likelihood of reentrainment and recollection on the filter 2 surface. Nevertheless, any such tendency is stopped by a wall before it begins. This wall 14, when it is provided, is placed underneath the filter 2, however, still above the lower end position of the scraper blade when it is in its zone B.

In accord with the FIGS. 1 and 2, a slide plate 140 is attached to the horizontal wall 14. This extends slantingly upward from the horizontal wall 14, with increasing distance from the filter 2. The minimal length (looking in the direction of the free end to the horizontal wall 14) of the slide plate 140 is so chosen that, giving consideration to the low pressure air flow directed to the filter 2, the scraped off fibrous material 4 from said filter 2 plus the fibrous material from the scraper blade itself, if it doesn't fall directly into the collection chamber 15, is captured by this slide plate 140 and from there assuredly slides into the said collection chamber 15.

The slide plate 140 can be dispensed with where there is either no horizontal wall 14 provided, or the wall 14 shows a relatively large separation distance from the plane E (see FIG. 2), because what is accumulated there falls into the collection chamber 15 is the fibrous material 4 scraped from the filter 2 or freed and dropped particulate from the scraper blade 3 falling through said large separation between the filter 2 and the horizontal wall 14. In another case, if the horizontal wall 14 runs tight up against the travel path of the scraper blade 3, and at the same time up to the plane E with the filter 2, this slide plate 140 serves the purpose that all falling fibrous material 4 definitely enters the collection chamber 15.

The provided slide plate 120 found in zone A can be omitted if care has been taken along other lines that fibers and fiber agglomerations can move from this point into the collection chamber 15. Thus, for instance, the transition from Filter 2 into the zone A can be built in stepwise fashion if, by appropriate entry of the low pressure, air flow into the filter chamber 12 flows through the zone A in such a manner that fibrous material which has accumulated here is entrained in the flow of the said low pressure air stream and is carried to eventual collection on filter 2.

It should be appreciated by those skilled in the art that various modifications and variations can be made in the present invention without departing from the scope and spirit of the invention. It is intended that the present invention include such modifications and variations as come within the scope of the appended claims and their equivalents.

What is claimed is:

1. A textile filtering apparatus for filtering out fibers from an airstream drawn from a textile machine, said apparatus comprising:

a low pressure chamber in pneumatic communication with a low pressure source for drawing said airstream through said low pressure chamber;

a filter disposed within said low pressure chamber so that said airstream is drawn through said filter;

a movable scraper blade assembly disposed adjacent a side of said filter away from said low pressure source, said scraper blade assembly movable between end positions beyond edges of said filter to contact and remove accumulated fiber from said filter, in said end positions said scraper blade out of contact with said filter, said scraper blade assembly movable in a first motion phase from a first said end position to a second opposite said end position and in a second motion phase from said second end position back to said first end position, and wherein in both said first and second motion phases said scraper blade assembly is kept in contact against said filter; and a controllable drive configured with said scraper blade assembly to move said scraper blade assembly between said end positions to periodically clean said filter.

2. The textile filtering apparatus as in claim 1, wherein said controllable drive is a linear drive mechanism.

3. The textile filtering apparatus as in claim 1, wherein said scraper blade assembly further comprises a leading scraping surface and an oppositely facing pressure surface, and wherein when said scraper blade moves between said end position in said first motion phase said scraping surface defines an obtuse angle with said filter and said pressure surface defines an acute angle with said filter.

4. The textile filtering apparatus as in claim 3, wherein said scraper blade assembly further comprises an extended support member adjacent said pressure surface, and wherein said scraper blade assembly comprises an elastic lip supported against said extended support member.

5. The textile filtering apparatus as in claim 4, wherein said elastic lip comprises a Shore Hardness of about between 40 and 80.

6. The textile filtering apparatus as in claim 4, wherein said elastic lip comprises an acute angled working edge defined on one side by said scraping surface and on an opposite side by an angled front surface extending between said pressure surface and said scraping surface.

7. The textile filtering apparatus as in claim 4, wherein said scraping surface defines a furthermost working edge, and said extended support member is adjustable relative to said elastic lip in a direction generally vertical to said working edge.

8. The textile filtering apparatus as in claim 7, wherein said extended support member is at a spatial distance of about 3 mm to about 8 mm from said working edge.

9. The textile filtering apparatus as in claim 4, wherein said scraper blade assembly comprises a first generally vertical leg and an angled leg extending from said vertical leg to define an acute angled tip profile, said elastic lip affixed in said scraper blade assembly with bolts that extend into a space defined by said vertical and angled legs.

10. The textile filtering apparatus as in claim 9, further comprising nuts secured to said bolts, and a shield member generally enclosing said nuts within said space defined by said vertical and angled legs.

11. The textile filtering apparatus as in claim 1, further comprising guides for receiving ends of said scraper blade assembly, and wherein at least one of said ends of said scraper blade assembly is connected to a linear drive so that said scraper blade assembly moves between said end positions within said guides.

12. The textile filtering apparatus as in claim 11, wherein said guides are inclined towards said filter in such a manner that said scraper blade assembly lies against said filter with a greater pressure nearer one of said end positions than nearer the other said end position.

13. The textile filtering apparatus as in claim 12, wherein said guides are angled towards said filter between about 1 degree and about 4 degrees.

14. The textile filtering apparatus as in claim 1, wherein a first one of said end positions is defined above said filter.

15. The textile filtering apparatus as in claim 14, further comprising an inclined slide plate disposed generally at said first end position and inclined away from said scraper blade assembly.

16. The textile filtering apparatus as in claim 1, further comprising a low pressure monitor disposed to sense pressure in said low pressure chamber, said low pressure monitor causing actuation of said controllable drive upon a predetermined limit pressure being sensed in said low pressure chamber.

17. The textile filtering apparatus as in claim 1, further comprising support struts adjacent said filter on a side thereof opposite from said scraper blade assembly, said support struts inclined relative to a direction of movement of said scraper blade assembly so that said filter is always supported by at least one of said support struts in any position of said scraper blade assembly against said filter.

18. The textile filtering apparatus as in claim 17, further comprising holes defined through said support struts generally along the length thereof.

19. The textile filtering apparatus as in claim 1, further comprising a collection chamber for fiber material scraped from said filter, said collection chamber defined by a generally horizontal wall disposed beneath said filter and above a lower one of said end positions of said scraper blade.

20. The textile filtering apparatus as in claim 19, further comprising an inclined slide plate extending upward from said horizontal wall generally from a location where said scraper blade assembly passes through said horizontal wall and inclined away from said filter.

21. A process for filtering air streams drawn from textile machinery, said process comprising drawing the air stream to be filtered into a low pressure chamber and through a filter disposed in the low pressure chamber, and moving a scraper blade across the filter in a first motion phase from a first position past an edge of the filter to a second position past an opposite edge of the filter wherein the scraper blade scrapes accumulated fiber from the filter, and then from the second position back to the first position in a second motion phase wherein the scraper blade presses against the filter without removing fibers therefrom, and wherein at the first and second positions the scraper blade moves out of contact with the filter.

22. The process as in claim 21, wherein the scraper blade travels linearly across the filter.

23. The process as in claim 21, further comprising gradually decreasing the pressure of the scraper blade against the filter during the first motion phase.

24. The process as in claim 21, wherein said moving of the scraper blade comprises moving the scraper blade in an essentially vertical motion against the vertically oriented filter.

25. The process as in claim 24, wherein the scraper blade moves from below the filter to above the filter in the first motion phase, and from above the filter to below the filter in the second motion phase.

26. The process as in claim 21, further comprising monitoring pressure in the low pressure chamber and automatically initiating movement of the scraper blade between said first and second positions to clean the filter upon reaching a predetermined pressure in the low pressure chamber.

27. The process as in claim 26, further comprising cleaning the filter at least one additional time by moving said scraper blade between said first and second positions if sensed pressure in the low pressure chamber does not reach a predetermined value upon a single cleaning operation.

28. The process as in claims 21, further comprising maintaining a low pressure condition within said low pressure chamber as said scraper blade moves between said first and second positions to clean the filter.

* * * * *